R. D. STRYKER.
STARTING DEVICE FOR AUTOMOBILES AND LIKE MACHINES.
APPLICATION FILED JULY 29, 1909.

973,232.

Patented Oct. 18, 1910.

2 SHEETS—SHEET 1.

ATTEST
E. M. Fisher
J. C. Musson.

INVENTOR
Robert D. Stryker
BY Fisher & Moore ATTYS.

R. D. STRYKER.
STARTING DEVICE FOR AUTOMOBILES AND LIKE MACHINES.
APPLICATION FILED JULY 29, 1909.

973,232.

Patented Oct. 18, 1910.

2 SHEETS—SHEET 2.

UNITED STATES PATENT OFFICE.

ROBERT D. STRYKER, OF HURON, OHIO, ASSIGNOR OF FORTY-NINE ONE-HUNDREDTHS TO N. E. WOESSNER, OF HURON, OHIO.

STARTING DEVICE FOR AUTOMOBILES AND LIKE MACHINES.

973,232. Specification of Letters Patent. Patented Oct. 18, 1910.

Application filed July 29, 1909. Serial No. 510,324.

*To all whom it may concern:*

Be it known that I, ROBERT D. STRYKER, citizen of the United States, residing at Huron, in the county of Erie and State of Ohio, have invented certain new and useful Improvements in Starting Devices for Automobiles and Like Machines, of which the following is a specification.

This invention relates to an automobile cranking or starting device, and has for its primary object, an improved construction and arrangement of parts, whereby the cranking or starting of the engines or motors of automobiles or the like may be easily done without the operator leaving the seat or the vehicle.

This invention also has for its object the lessening of the liability of injury to the operator in the event of back firing or reversal of the engine and consequent "backlash".

Figure 1:
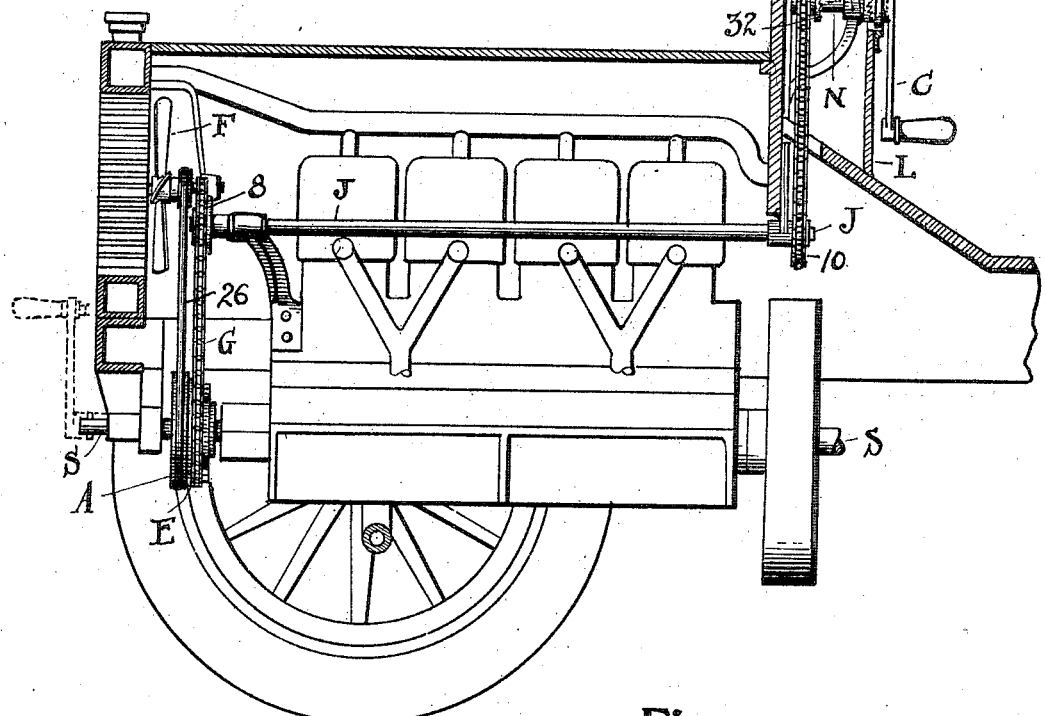
Figures 2, 3:
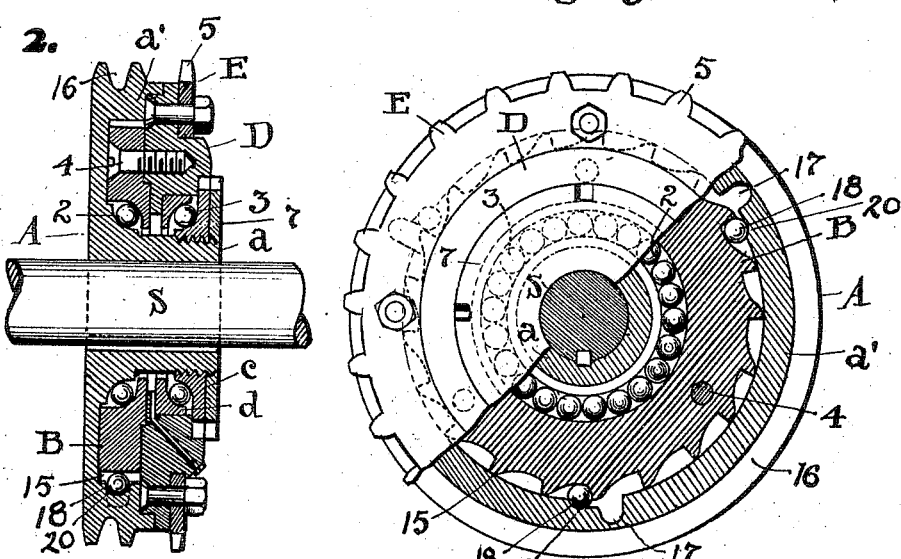
Figure 4:
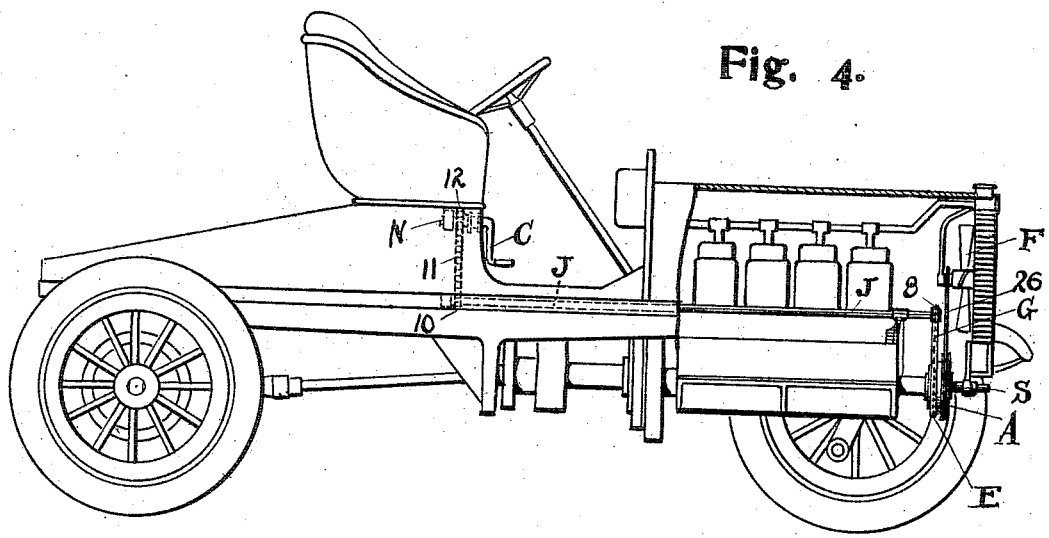
Figure 5:
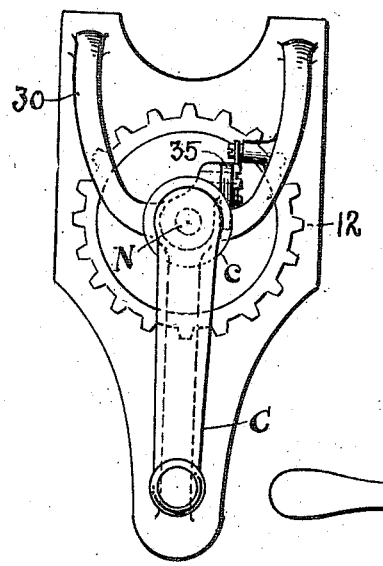
Figure 6:
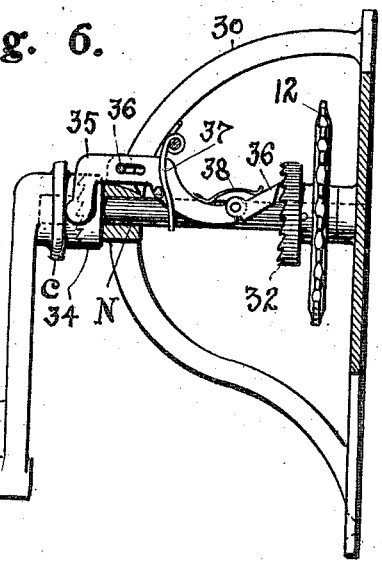

In the accompanying drawings, Figure 1 is a side elevation of the front portion of an automobile having my new and improved devices installed therein and with parts thereof in vertical section to more clearly disclose internal construction and relation of parts. Fig. 2 is a cross section of the ratchet mechanism through which starting or cranking of the engine is effected and taken on the line of the shaft carrying the same. Fig. 3 is a side elevation of said mechanism and a cross section of the shaft on which it is mounted. Fig. 4 is a side elevation of the machine corresponding to Fig. 1 but showing a modification of the starting mechanism with a crank at the seat. Fig. 5 is a front elevation of the cranking mechanism shown in Fig. 1, and Fig. 6 is a side elevation thereof.

In all cranking or starting work of this general character heretofore there have existed the elements of great inconvenience because the operator had to leave his seat and go to the front or side of the machine to do the work, and of positive danger unless great care was exercised of being "kicked" by the action of the engine when the start was made, or injured by the sudden starting of the car in the event that the clutching mechanism should be inadvertently thrown in. The present invention has in view not only the practical elimination of all these objections but the introduction of devices whereby the operator can occupy his seat and crank or start the machine with perfect safety and with comparative ease so far as the use of strength is concerned. To these ends I mount the primary cranking or ratchet parts or operating elements directly or indirectly upon the engine shaft S and operate the said parts by a hand crank C or equivalent means located at some place in the front of the car convenient of operation from the driver's seat, preferably upon the dashboard as shown, and a line of mechanism connecting the same operatively with said primary cranking parts as will now appear. Thus, the said cranking parts comprise a main member or wheel A having a laterally extended hub $a$ keyed or splined on shaft S and carrying a ratchet ring B and a side ring or part D mounted together on the side hub $a$ on the inner side of said wheel and resting upon antifriction balls or rollers 2 and 3 respectively, intervening the said rings and hub to relieve friction and sustain said parts on the hub. The wheel or member A of this group of parts has an annular rim $a'$ in which the ratchet ring B is located and a race is provided for said balls 2, between the said ring B and a hub $a$, substantially as shown, and a corresponding race is provided for balls 3 within side ring D by means of a minor bearing ring $d$ next within said part D and a counter ring $c$ screwed onto hub $a$ and said minor rings are fashioned respectively on opposite edges to provide said race. Obviously these details may be considerably varied and not depart from the invention.

Practically the rings B and D are one, being rigidly connected by screws 4 at intervals, the idea being that the part D serves as a side support for ratchet B and affords means for attaching the actuating toothed ring E thereto. Even this ring might be integral with ring D, or also with ring B except for possible convenience of manufacture or considerations of economy in service, such as the furnishing of new parts in case of breakage here or there. Practically, therefore, the wheel A carries a ratchet wheel mounted on antifriction balls or rollers about the hub thereof, and said wheel is provided with teeth 5 about its outer periphery, or, more properly, ring E has said teeth thereon and which are adapted to be engaged by sprocket chain G in the line of operating mechanism from crank C. When assembled, as shown, the details, or parts B, D and E, are rigidly united and essentially unitary, and are so regarded in the further description herein and in the claims. A ring shaped lock nut 7 holds ring c in place. It follows that while wheel A is fixed upon and rotates with shaft S, the embodiment or unitary member represented by B, D and E is free to turn in either direction therein subject to control through said sprocket chain G. As to this line of operating mechanism the said chain runs over a relatively small sprocket wheel or pinion 8 on a shaft J, and said shaft terminates at its inner end beneath a narrow box L immediately at the operator's feet either upon the dashboard at or beneath the seat, say as shown in Fig. 4. In either case the said shaft is operatively connected with short crank shaft N by means of a sprocket chain 11 running over gears 10 and 12 respectively on said shafts, but bevel gearing or its equivalent may be used instead. Positive operating control of the cranking mechanism mounted in or upon wheel A is thus given to crank C, and the further details of this mechanism will now appear. Thus, the said ratchet member, or, more specifically, the ring B has a succession of ratchet teeth 15 about its periphery and running next within the rim a' of wheel A which encircles said teeth and which has ball pockets 17 at infrequent intervals on its inside adapted to receive locking or wedging balls 18. Normally, or when the machine is running, the said balls occupy said pockets and are held therein by centrifugal force in wheel A, but when rotation of said wheel ceases said balls, or one or more of them, will drop out of its pocket 17 and roll into the short groove or depression 20 open to said pocket at one end. This brings the ball into the path of the ratchet teeth 15, where it is engaged by the first tooth next behind and by which it is pressed against the end shoulder or stop of said groove or bevel, and said ratchet ring is thereby locked into working engagement with wheel A. Such engagement has occurred in at least two of the said grooves as seen in Fig. 3, and enough such pockets, grooves and balls are distributed about said ratchet to be sure of always making engagement with one or more. When this occurs the parts are in position and relation to crank the engine from crank C, and the proper rotation will start shaft S and set the engine in motion. When the engine is started the wheel A is liable to be carried forward with a quick jerk and away from engagement by ball 18, and said ball is thereupon rolled back into pocket 17 and all the cranking mechanism is released. Obviously there is no room for violence or danger to the person in this operation because the moment the ball is again pocketed release of the cranking parts occurs automatically and this is instantaneous with the starting of the engine. Centrifugal force will then hold all the balls in their pockets until rotation ceases. Friction between the ratchet member and wheel A is minimized by the antifriction balls 2 and 3 as above described, and said balls are housed so as to exclude dust. Any suitable provision may be made for oiling these bearings when necessary, as indicated by duct 22.

Pawls or other operative means for engaging the ratchet member with wheel A may be employed in lieu of balls 18, as well as any suitable or equivalent mechanical connection between crank C and said ratchet to operate the ratchet and crank the engine, but the constructions shown are found to be very satisfactory. The most available position on shaft S for the ratchet mechanism may be chosen, whether as shown or on some other part thereof farther back.

The periphery of wheel rim a' has a groove 16 for a cord or belt 26 which drives the cooling fan F.

Short shaft N which is shown in Figs. 1 and 6 as carrying the immediate cranking mechanism, is supported in a suitable bracket 30 fixed upon dash-board O.

The foregoing mechanism is for the most part reproduced in Fig. 4 wherein the starting crank C is located at the bottom and front of the seat. In this modification the shaft J is extended through to a point under the seat and sprocket chain 11 and its wheels 10 and 12 and short shaft N are located under the seat instead of being in the box on the dash-board as in Fig. 1. Otherwise there is no difference in construction and operation of the cranking or starting mechanism already described. However, Figs. 1, 5 and 6 do show parts and adaptations not present in Fig. 4 and which consist in means for automatically disengaging crank C the instant back lash occurs in starting the engine. To these ends I affix a ratchet wheel 32 upon short shaft N next to sprocket wheel 12 in this instance and provided with teeth on its side. The head of crank C is provided with an annular rim or rib c, and said head has ratchet teeth on its inner side or face adapted to engage with corresponding teeth on ratchet head 34 fixed on shaft N. Interposed beneath said rim c and ratchet wheel 32 is a member 35 having a longitudinal slot by which it is slidably mounted on a pin 36 on bracket 30. The front end of said member extends downward at right angles and has an enlargement bearing against the said crank rim c, while the opposite or inner end thereof carries a pawl 36 adapted to engage ratchet wheel 32. Said member or lever 35 is further provided with a spring 37 to keep or hold it normally outward and so as to keep pawl 36 with ratchet 32 except when engaged by rim c, and pawl 36 has a bowed or other spring 38 bearing thereon to hold it in working position with ratchet 32. Now, assuming that cranking is to occur, the operator will press the crank inward so as to engage head 34 and this will force the other parts into the position and relation shown in Fig. 6. When thus positioned, the pawl 36 will lie idle as wheel 32 is rotated past the same in the operation of cranking, but the instant back action takes place under a kick from the engine the pawl 36 will be engaged by the first ratchet tooth on wheel 32 and by swinging down but a slight distance will straighten out or close itself at its shouldered joint and thus force the crank out of operating engagement with ratchet part 34 by a sliding and oscillatory movement of lever 35 on pin 36. The back or reverse movement permitted before lever C is thrown out is so slight and so quickly follows reversal that there is neither time nor distance of movement in the crank to permit injury to occur.
Obviously the foregoing may properly be considered as only one of different adaptations of mechanism that will operate to give the same result and protect the operator and all equivalents of the means shown are deemed to be within the spirit and scope of my invention.

What I claim is:

1. In engine starting devices, an engine shaft and ratchet mechanism mounted thereon and comprising a wheel fixed on the shaft and having a side rim with pockets at intervals, a ratchet ring mounted on the side of said wheel and having teeth on its periphery, and balls in said pockets adapted to come into locking relations with said teeth.

2. In starting devices for engines, a shaft having a member fixed thereon provided with a hub and a plurality of pockets within its periphery, a ring supported on ball bearings on the hub of said member and having teeth opposite said pockets and a ball in each pocket, said member having a short shouldered groove next to each pocket adapted to receive said ball for locking said ring operatively with said member.

3. The combination with an engine shaft of a wheel secured thereto, provided with a flanged rim having one or more inwardly opening pockets, a ratchet rim mounted within said flanged rim and having movement independent of said wheel, and wedging elements in said pockets adapted to be engaged by the teeth on said ratchet ring and bind the same to the said wheel.

4. In automobiles and like vehicles, an engine shaft and a wheel fixed thereon having a circular recess in its side provided with a plurality of cavities in its periphery, a ratchet ring rotatably mounted within said recess and a gravity ball adapted to operatively lock said ring with said wheel and to be automatically released through power rotation of said shaft, said wheel having depressions next to said cavities adapted to receive said balls when locking occurs.

5. In engine starting devices, the combination of a shaft and a wheel fixed thereon having a laterally extending hub fixed on said shaft and provided with a recess in its inner side and cavities at intervals in the periphery of said recess, a ratchet member loosely mounted on said hub in said recess and having teeth about its periphery opposite said cavities, and gravity balls adapted to engage said member with said wheel at said cavities and to be automatically disengaged when the engine is started.

6. In starting devices for vehicle engines, an engine shaft and ratchet mechanism thereon adapted to operatively engage said shaft, in combination with a hand crank at the front of the seat, and positive operating means connecting said crank with said ratchet mechanism comprising a countershaft and gear connections at its respective ends and a longitudinally slidable lever engaged by said hand crank, a pawl pivoted on said lever and a ratchet wheel on said counter-shaft adapted to be engaged by said pawl.

7. In starting mechanism for vehicles having explosive engines to drive the same, a shaft and starting mechanism thereon comprising a hand member adapted to rotate the shaft, and pawl and ratchet mechanism to press said hand member out of working engagement upon reversal of movement of said shaft from the engine comprising a spring pressed lever mounted to slide lengthwise within limits and having a head adapted to be engaged by said hand member and a pawl pivoted on the other end thereof.

8. In starting mechanism for vehicles, a shaft and a ratchet wheel thereon, a hand member adapted to be operatively engaged with said shaft and a kick-off part operatively engaged with said ratchet wheel and said hand member to disengage said hand member from said shaft upon reversal thereof comprising a lever longitudinally slidable and a pawl pivoted thereon and adapted to engage said ratchet wheel.

In testimony whereof I affix my signature in presence of two witnesses.

ROBERT D. STRYKER.

Witnesses:
A. H. PEARL,
E. C. SHEPHERD.